June 10, 1930.  C. J. STRAUB  1,762,843
HOLDER FOR CUT FLOWERS
Filed Aug. 18, 1927
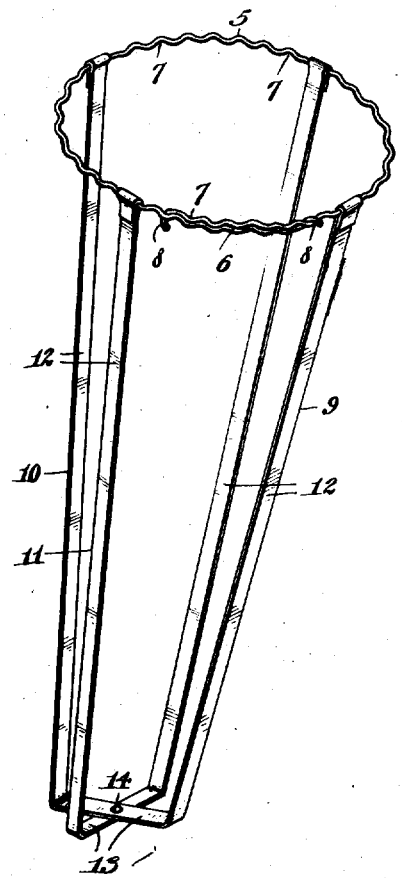
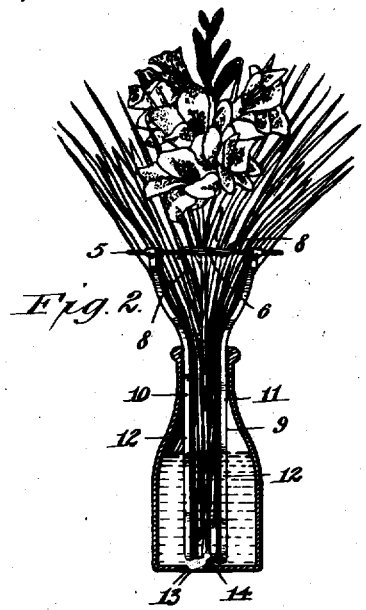
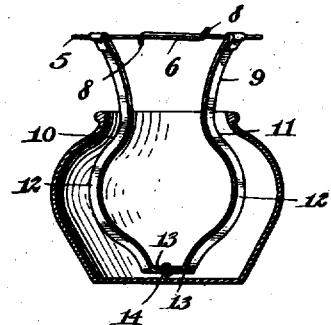
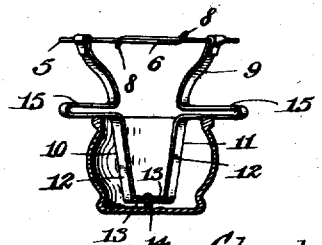
Charles J. Straub, Inventor.
Witness:
J. Oberst.

Patented June 10, 1930

1,762,843

UNITED STATES PATENT OFFICE

CHARLES J. STRAUB, OF GOWANDA, NEW YORK

HOLDER FOR CUT FLOWERS

Application filed August 18, 1927. Serial No. 213,769.

My invention relates to a holder for cut flowers.

Cut flowers having long stems, and particularly roses and other hot house flowers, are sold at considerably higher prices than flowers having short stems, and for that reason, as well as for the reason that long stem flowers can be more effectively arranged and artistically displayed, they are in greater demand. However, vases and other vessels or containers intended for use in holding and displaying flowers are invariably too short to effectively display flowers of the better and more expensive kind, and this is particularly true of the vases and receptacles used in cemeteries for holding cut flowers.

The primary object of my invention is to provide a holder for cut flowers adapted for use in conjunction with any kind of water-retaining vessel or container, regardless of its height or slenderness; this being a decided advantage since many people use receptacles of any kind for holding flowers, and oftentimes when displaying flowers on or adjacent graves, vessels or containers for which they have no other use, regardless of the suitability of the same for such purposes.

My invention has for another object the provision of a holder for cut flowers, which can be easily shaped to conform more or less to the vessel or container into which the stems of the flowers are to be placed.

Another object of my invention is to provide a holder for cut flowers in which provision is made for conveniently retaining the stems or other parts of flowers so that the flowers may be artistically arranged and retained in such condition.

A further object of my invention is to provide a holder for flowers which has a retainer ring adjustable to the size of the bouquet of flowers so that the flowers may be spread or separated for artistic display.

A still further object of my invention is the provision of a holder for cut flowers, which is simple and inexpensive, and the parts of which are comparatively slender so as to be more or less obscure when placed within a vessel or container while having the stems of the flowers confined therein.

With the above and other objects in view, the invention consists in the novel features of construction and in the arrangement and combination of parts to be hereinafter described and more particularly pointed out in the subjoined claims.

In the drawings:

Fig. 1 is a perspective view of my improved holder showing the parts thereof in normal condition.

Fig. 2 is a sectional elevation of a vessel or water-container having my improved holder inserted therein, with the side or retainer-ring supporting members shaped to suit the conformation of the vessel or container and showing cut flowers and foliage assembled and held thereby.

Fig. 3 is a sectional elevation of a vessel or water-container and my improved holder arranged therein, the container being of comparatively large diameter and the side or retainer-ring supporting members of the holder formed to conform somewhat to the shape of the vessel or container.

Fig. 4 is a side elevation of my improved holder arranged within a comparatively small and shallow vessel or water-container, the side or retainer-ring supporting members of the holder being bent upon themselves so as to considerably reduce the height of the holder and also provide proper supports for the holder.

The device comprises a retainer ring 5, which is preferably constructed of thin wire curved into ring formation with the ends of the wire overlapped, as at 6. This wire is preferably crimped along its entire length so as to provide interior indentations 7, and the extremities of the wires are in the form of hooks 8 which may be engaged with any of said indentations within a limited region. These hook ends are retained in firm engagement with parts of the ring near the ends of the wire by reason of the tendency of the wire to spread outwardly at their outer ends, due to the circular conformation of the same, and therefore the ring is retained to adjusted size with the crimped portions at one end of the wire overlying the crimped portion at the other end.

In order to change the diameter of this retainer-ring it is only necessary to force the hooks inwardly out of engagement with the wire and pull upon the wires near their outer ends for enlarging the ring, or exert pressure lengthwise toward the terminals of the wire to diminish the diameter of the ring. By taking hold of the ring and using the thumbs of opposite hands to force the hook ends of the wire inwardly to a slight degree, pulling on the wires with a view of bringing the extremities thereof closer together, or exerting pressure on the wires in a direction toward their extremities will cause the hooks at opposite ends of the wires to ride in contact with the crimped portion of the wires and upon releasing the thumb pressure, the hook ends will immediately find lodgement in certain indentations of the wire and hold the ring in adjusted position. This ring is adapted to be held elevated above the upper end of a vase or other container, and for this purpose a support 9 for the ring is provided which is comparatively long and preferably tapered from the ring downwardly to its lower end.

In preferred form this support comprises two members 10, 11, which are of elongated U-formation and formed of thin narrow strips of pliant metal. Each of these members comprises, in the form in which the holder is sold, two downwardly-converging side members 12 and a short cross member 13 connecting the lower ends of said side members, the upper ends of said side members being fastened to the retainer ring 5 in any suitable manner. In the drawings, I have shown connection between said side members and said retainer ring effected by bending the side members around the ring and soldering the contacting parts of said side members together but this connection may be made in any other approved manner.

The two supporting members of the support are arranged at right angles to each other so that connections of the supporting members to the retainer-ring are made at points spaced substantially equi-distantly around the ring. The short cross members 13 of the two supporting members are pivotally connected together, as at 14, so that slight movement of either of said supporting members with respect to the other is possible, and this is found desirable due to the fact that two adjacent side members of the two supporting members are caused to be moved toward or from each other when changing the size of the retainer-ring. A tight rigid connection of the two supporting members at their point of crossing would, under such conditions, result in strain being applied to the connection and after adjusting the retainer-ring to different sizes a number of times, the connection of the supporting members would become loosened and separated.

By reason of the length of the holder, cut flowers having long stems may be artistically arranged within a vase or other elongated container, as it is only necessary to thrust the lower end of the holder into the container so that the upper end thereof projects out of the top of the same. In many instances it is not necessary that the holder be thrust into the vase to the extreme lower end thereof, and this is particularly true where the opening of the vessel is smaller in diameter than that of the retainer-ring. In such cases the friction of the upper portions of the side members 12 against the inner surface of the container will retain the holder within the container in elevated position and the holder will extend out of the upper end of the container a considerable distance so that the cut flowers will be properly supported without drooping, thus making it unnecessary to shorten the stems, as is often found necessary, thus detracting from the beauty of the flowers and their display.

The holder may be painted green to conform to the stems and foliage of the flowers, and thus the projecting upper end of the holder will hardly be noticeable. The stems of the flowers are inserted downwardly through the retainer ring and may be passed down between the side members of the support and beyond the lower end of the support, sufficient opening being provided between the side members 12 and also around the cross members 13 of the support so that these members do not in any manner interfere with the proper placing of the stems within the container, when, for example, the holder is not thrust into the receptacle to the extreme lower end.

The stems of the flowers when placed within the retainer-ring may be seated in any of the crimps of this ring, and thus after arranging the flowers in an artistic manner, they will be retained in such condition due to the impossibility of the stems sliding along the wire of the retainer-ring. This is a particularly desirable feature of my invention when using the same in water containers upon or adjacent graves in cemeteries, since only high winds will be able to displace the stems of the flowers from the indentations formed in the retainer-ring.

In Fig. 2 I have shown a conventional milk bottle into which my improved holder is placed, and as it is common practice to use discarded milk bottles in cemeteries for holding flowers, my improved holder is particularly desirable for use in connection with such bottles. As a milk bottle is short compared to a flower vase, the holder may be thrust thereinto so that the lower end rests in contact with the bottom thereof. Due to the fact that the neck of the bottle is narrower than the holder at even height, the side members thereof will be flexed inwardly and therefore the straight line conformation of these side members, as shown in Fig. 1, will be changed to the shape shown in Fig. 2, or otherwise.

Oftentimes, only shallow vessels or containers are available for use in cemeteries, and in Fig. 3 a comparatively shallow but extremely wide vessel is shown. When using my improved holder in connection with a vessel of this kind, the holder is thrust into the vessel and the side members bulged outwardly so as to widen the holder. Usually the side members are bent to conform more or less to the shape of the vessel or container, and when so bending the side members the holder is considerably reduced in length, yet sufficient length is provided for properly holding flowers having comparatively long stems.

When using an extremely shallow vessel of comparatively small or large diameter, such as shown in Fig. 4, it may be found desirable to bend the side members of the holder upon themselves, as shown at 15, in which case four radial supports are provided which may lie against the upper edge of the vessel. The holder will still be of considerable length compared to the height of the vessel, and flowers may be arranged within the vessel in an artistic manner, not possible without the use of the holder in a vessel of this type.

Due to the fact that the side members are made of comparatively thin and narrow strips of pliant material, preferably metal, they may be bent or curved to any desired form and after use be straightened so that the holder may be placed within a slender flower vase of considerable height, or within any vessel of different shape from that in which the holder was last used, since these side members may again be bent to any desired shape.

Having thus described my invention, what I claim is:—

1. A holder for cut flowers, comprising a support and a retainer-ring at the upper end of said support, said support being constructed of pliant material so that any part along the length thereof may be diminished in width.

2. A holder for cut flowers, comprising a support adapted to be thrust within a water container, and a retainer-ring at the upper end of said support, said support being constructed of a plurality of pliant members capable of being bulged or bent along the length of the support to increase the width of the same.

3. A holder for cut flowers, comprising a support adapted to be thrust within a water container, and a retainer-ring at the upper end of said support, said support being constructed of a plurality of pliant members connected at their upper ends to said retainer-ring and arranged so that any part along the length thereof may be flexed or bent to increase or diminish the width of the support.

4. A holder for cut flowers, comprising a support adapted to be thrust within a water container and comprising a plurality of spaced upstanding members, and a retainer-ring at the upper end of said support connecting said upstanding members, said support being constructed of pliant material so that the holder may be reduced in height by bending said material.

5. A holder for cut flowers, comprising a support adapted to be thrust within a water container and comprising a plurality of spaced upstanding members connected together at their lower ends, and a retainer-ring at the upper end of said support connected to said upstanding members, said upstanding members being constructed of pliant material so that the holder may be reduced in height and changed in lateral dimensions.

6. A holder for cut flowers, comprising two elongated U-shaped members arranged at right angles to each other and loosely connected together at their lower ends, said U-shaped members being formed of pliant metallic strips adapted to be bent into any desired form, and an expansible and contractible retainer-ring connected to the extremities of said U-shaped members.

7. A holder for cut flowers, comprising a support formed of two thin pliant slender metallic strips, each strip bent upon itself to form a medial cross member and two side members converging downwardly to said cross member, said side members being bendable to shorten and widen the holder and said cross members crossing each other at right angles and being pivotally connected together at their point of crossing, and an expansible and contractible retainer-ring at the upper end of said support having the ends of said metallic strips connected thereto equidistantly around the ring.

In testimony whereof I affix my signature.

CHARLES J. STRAUB.